United States Patent [19]

Martin

[11] 3,827,326
[45] Aug. 6, 1974

[54] TABLE FOR USE WITH TRAVERSE POWER TOOL

[76] Inventor: Gilbert E. Martin, 5139 Grandy Ave., Detroit, Mich. 48211

[22] Filed: Apr. 2, 1973

[21] Appl. No.: 347,224

[52] U.S. Cl............... 83/468, 83/471.2, 83/488, 83/522, 83/574, 144/134 R, 144/136 R
[51] Int. Cl....... B27b 27/02, B27b 5/18, B27c 5/04
[58] Field of Search ....... 83/467, 468, 471.2, 471.3, 83/471.1, 483, 484, 485, 488, 487, 522, 574; 144/134–136

[56] References Cited
UNITED STATES PATENTS
2,850,058  9/1958  Stoll .................................. 83/468
3,141,367  7/1964  Keener et al. ...................... 83/467
3,730,042  5/1973  Price................................. 83/471.3
3,770,031  11/1973  Olson........................... 83/471.2 X

*Primary Examiner*—Donald R. Schran
*Attorney, Agent, or Firm*—Robert G. McMorrow

[57] ABSTRACT

A table has a flat surface to support one or more workpiece articles in such fashion as to provide for uniform cutting or shaping operations thereon. The table has side guide rails to which a backstop assembly and a swing arm assembly are adjustably mounted. The swing arm assembly includes a crossbar used to guide the traverse of a work tool. Extension means for the backstop assembly is also provided.

6 Claims, 9 Drawing Figures

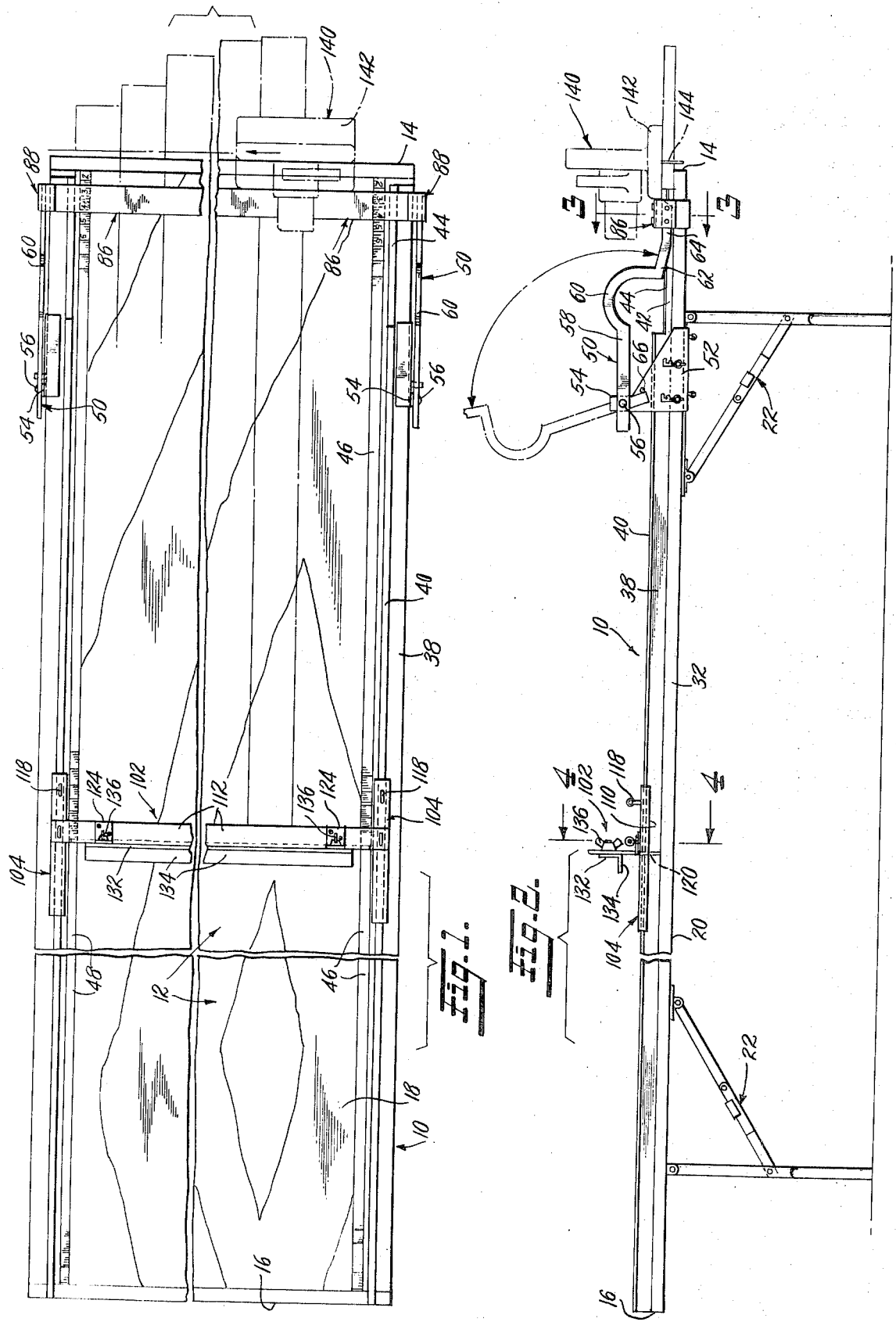

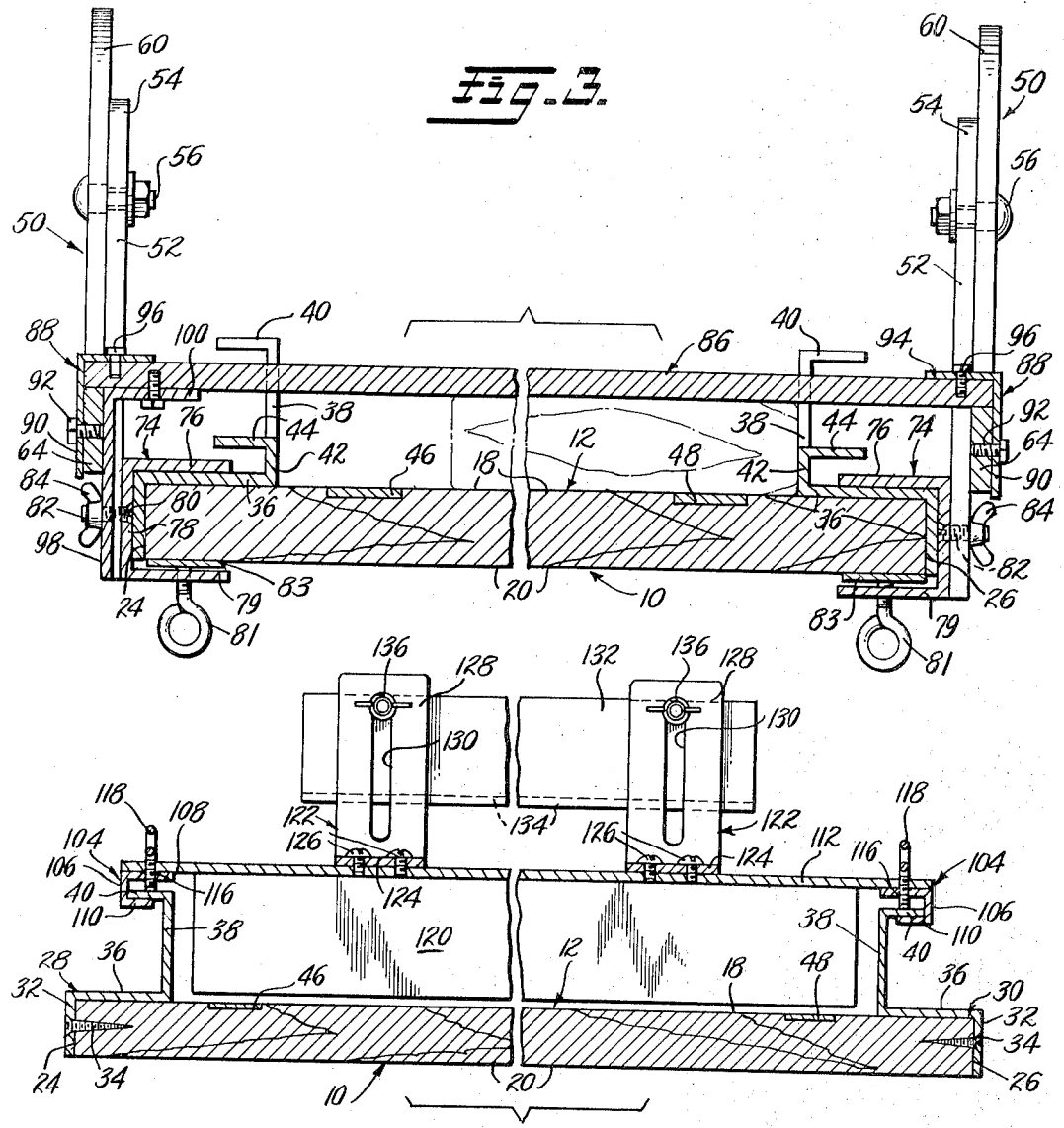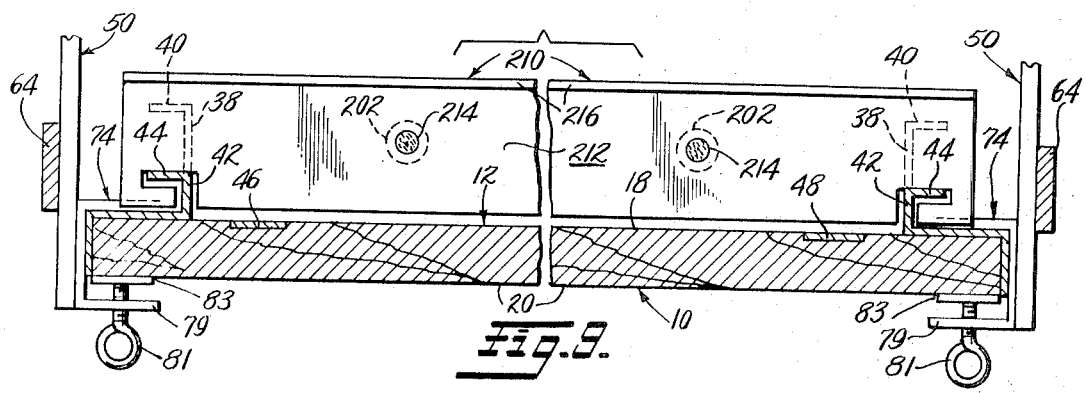

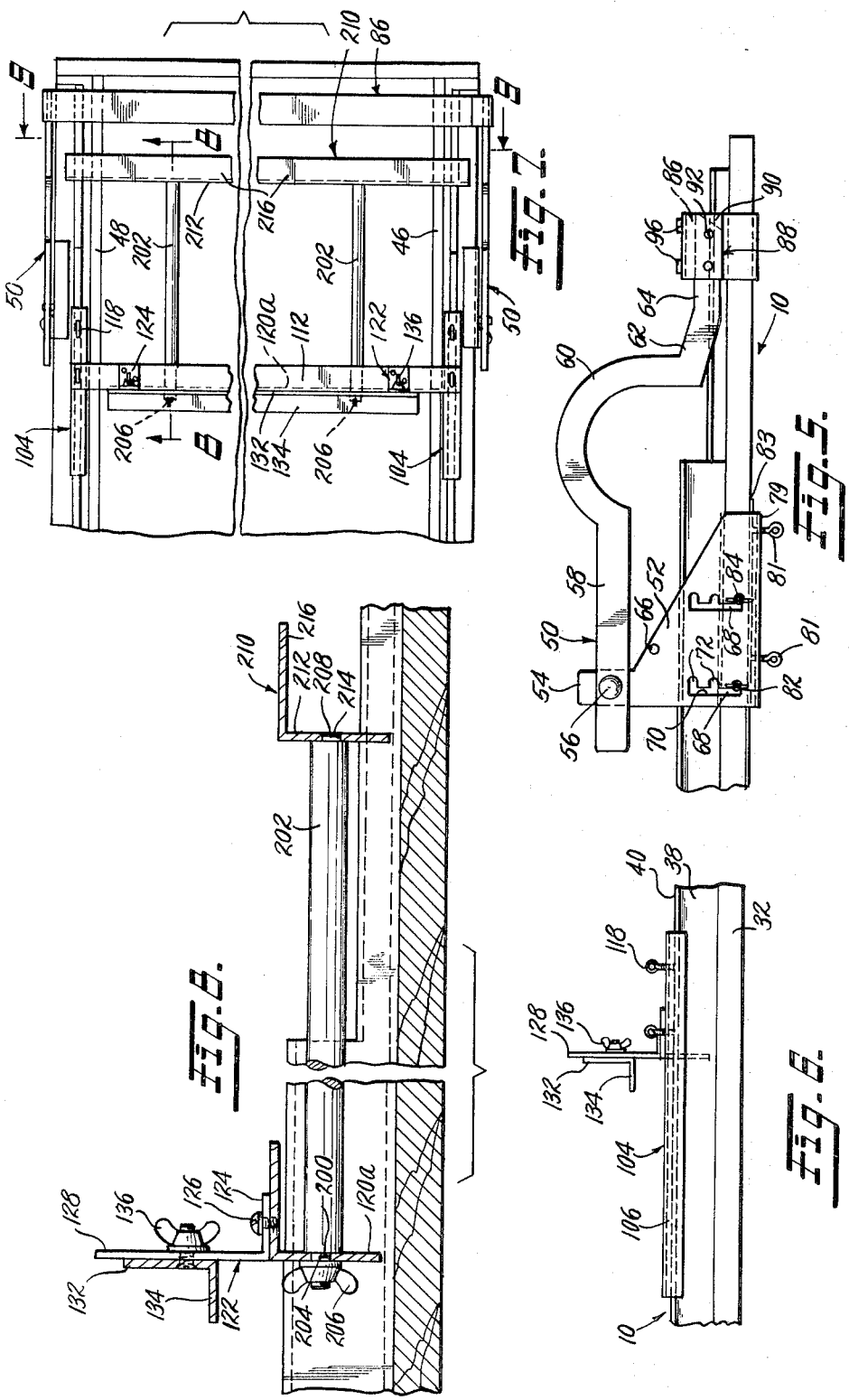

TABLE FOR USE WITH TRAVERSE POWER TOOL

BACKGROUND OF THE INVENTION

1. Field of the Invention

This invention relates to a work guide for performing cutting or shaping operations on a workpiece or several workpieces with a power tool or the like. More particularly, the invention relates to a work holding or gauging table employed in carpentry, building trades, cabinet making, and like operations.

2. Statement of the Prior Art

Adjustable saw guide devices, including in some instances, a work support feature, have been heretofore proposed.

SUMMARY OF THE INVENTION

The present invention provides a table and guide particularly adapted to rapid and accurate operations on single or multiple workpieces following initial set-up of the components. This is accomplished through a unique combination which includes a support table, measurement indicia, and changeable guide and back-stop components. The unit is amenable to a multiplicity of gauge settings as to length of cut, and to numerous depth settings. Included in the structural components is a measurement means for rapid set-up.

An important feature of the invention resides in the provision of means to permit the clamping of the multiple workpieces together. This assures uniformity of cut therebetween. The apparatus is employed in carpentry, form building, cabinet making and other trades in which a number of workpieces of uniform length are to be cut or formed. Employment of the apparatus permits these operations to be performed by relatively unskilled labor.

The invention also avoids wasting of raw materials and thus effects economies in building. It also provides a safety factor by permitting the operator to concentrate on the operation which he is performing rather than giving attention to dimension characteristics at the time of such operation.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a foreshortened top plan view of the cutting table of the present invention;

FIG. 2 is a side elevational view of the cutting table as shown in FIG. 1;

FIG. 3 is an enlarged fragmentary transverse sectional view taken on the line 3—3 of FIG. 2, through the cutting tool guide bar.

FIG. 4 is an enlarged fragmentary transverse sectional view taken on line 4—4 of FIG. 2, looking through the adjustable back gauge of the cutting table;

FIG. 5 is an enlarged fragmentary side elevational view of the pivoted arm assembly for the guide bar;

FIG. 6 is an enlarged fragmentary side elevational view of the adjustable back gauge;

FIG. 7 is a fragmentary plan view of the forward end of the cutting table illustrating a modification of an extension assembly for the back gauge;

FIG. 8 is an enlarged fragmentary longitudinal sectional view, taken on line 8—8 of FIG. 7, showing the extension assembly; and FIG. 9 is an enlarged fragmentary transverse sectional view, taken on line 9—9 of FIG. 7.

DESCRIPTION OF THE PREFERRED EMBODIMENT:

Referring to the drawings in more detail, a saw or router guide table according to this invention is therein generally identified by reference character 10. The device 10 comprises an elongated substantially flat table top 12 formed of wood or other suitable material and having forward and rear ends 14, 16, an upper side 18, and a lower side 20. Folding leg structures 22 of conventional form are connected to the lower side 20 of the table adjacent the respective ends thereof. The leg structures serve to support the table in appropriate position and at a selected convenient height.

The table further includes lateral sides 24, 26 to which are connected side rails 28 and 30. In FIGS. 3 and 4 it will be best observed that the rails each includes a vertical outside flange 32 secured by screws 34 to the sides 24 and 26. Projecting horizontally inward from the flanges are plates 36 which are flush against the top 18 of the table. Throughout the major longitudinal extent of each rail, a vertical plate 38 projects integrally from the inside edge of the plate 36, and each of the plates 38 has a lateral outward flange 40. At a selected forward length of each of the rails 28 and 30, a vertical wall 42 extends upwardly from the plate 36 rather than the plate 38. This vertical wall also has an outward plate flange 44, the functioning as described below. It will be noted that the rails 28 and 30 are identical but of reverse application to the respective sides of the table.

In FIG. 1 it is to be noted that measurement strips 46 and 48 are fixed to the table top 18 adjacent the rails. The strips are calibrated with appropriate measurement indicia.

A major component of the invention is a swing arm assembly 50. The assembly 50 comprises a pair of substantially triangular plates 52, each having a vertical extension 54 at its upper end, pivots 56 being rotatably carried therein. An elongated arm 58 is secured to each pivot and has an arch section 60, an angle portion 62, and a straight portion 64. Each of the plates 52 further includes an outwardly extending stop lug 66 which, as shown in FIG. 2, limits the rearward pivot movement of the arms 58. The provision of the arch sections 60 is of substantial importance, in that this permits the employment of a pipe clamp or similar device to hold workpiece materials during cross routing operations.

The plates are adjustable as to height by means of compound slots 68 shown in FIG. 5. These slots have major upright openings 70, and a selected number of forwardly extending, substantially horizontal branch slots 72. The longitudinal position and height of the plates 52 is effected through the means supplied for connection of the swing arm assembly to the rails 28 and 30. Such means includes a pair of C-shaped plate retainers 74 best shown in FIG. 3. Each of the retainers 74 has a top piece 76 which bears against the rail plates 36 below the flanges 44, being retained therebetween, and a bight portion 78 which is vertical, and which bears on the flanges 32. The bottom pieces 79 have threaded openings receiving therethrough screws 81 which bear against reinforcing strips 83 on the lower side 20 of the table top. The side pieces have inwardly countersunk openings 80 therein from which extends screws 82 with wing nuts 84. The screws 82, of which two are supplied on each side piece 78, project through the slots 68 and are engageable in selected branch slots 72 in order to vary the height of the plates 52.

The forward straight portions 64 of the arms 58 are spanned by an elongated saw guide bar 86. The bar 86 is secured to the portions 64 by means of L-shaped stabilizer brackets 88, each having a vertical leg 90 affixed by screws 92 to the arm portions 64, and a horizontal top arm 94 secured by screws 96 to the bar. Stabilizer 98 has a connecting flange 100 secured to the bar 86, and prevents displacement of the bar when in operating position. The stabilizer is required at one side only of the assembly.

A backstop assembly for locating and retaining the inboard ends of the workpieces is generally identified by reference numeral 102. The backstop includes channel members 104 having bight portions 106, and top and bottom legs 108, 110. The channel members ride on the outward flanges 40 of the side rails 28 and 30, and a cross member 112 spans the top legs 108 of the channel members. The top legs 108 have threaded openings 116 formed therein. Securing screws 118 extend through said openings to abut the flanges 40 and adjustably lock the backstop assembly in selected location thereon. An enlarged back wall 120 depends from the cross member 112 but is of reduced width relative thereto in order to permit sliding of the same between the plates 38 of the side rails. The wall 120 serves as the abutment back member for materials within its height range.

A pair of tilt stop brackets 122 are mounted on the cross member 112. Each of said stop brackets comprises a foot portion 124 secured by screws 126 on the member 112, and an upstanding leg member 128 projects therefrom. Each of the leg members has a vertically elongated slot 130 formed therein. A tilt stop plate 132, having a ledge 134 is reversibly and adjustably secured to the bracket leg members 128 by wing nut-screw means 136.

The table is employed with a tool 140, such as a power operated hand saw, having a guide base 142 and a blade 144.

In use, a desired dimension of cut is computed on the basis of the distance between the backstop wall 120 and the remote edge of the guide bar (allowance being made for the distance between the tool blade and the edge of the tool guide bar 142). Such dimensions are readily ascertained from the strips 46 and 48. In large scale operations a test piece is normally cut as a first step in the procedure, and thereafter measured, in order to insure accuracy of alignment of the components. One or more workpieces, typically 2 by 4 inches lumber stock or the like, are then abutted against the wall 120, and the plates 52 of the swing arm assembly are adjusted to appropriate cutting height. The saw is then operated across the collected workpieces (see FIG. 1), the base 142 of the saw being guided by the bar 86. The backstop assembly is reversible in order to use the tilt stop 7n work too thin to be accommodated by the member 112. The member 112 and the ledge 134 act to retain materials that would be two or more times longer than the desired cutting lengths.

In FIGS. 7 through 9, a modification of the structure is shown which is intended to provide for cutting of short lengths of material, thereby effecting salvage of materials not otherwise used in mass production operations. In this modification, the back wall 120a of the backstop assembly has apertures 200 formed therein. A plurality of elongated rods 202 are provided, and have reduced diameter first ends 204 which extend through said apertures. These ends are threaded to receive wing nuts 206 which serve to releasably engage the rods in forwardly projecting locations on the wall. The rods have second reduced ends 208. An auxiliary backstop 210 has a vertical backstop wall 212 with openings 214 in which the ends 208 are frictionally engaged. A top wall 216 is employed to further stabilize material being cut. This extension permits the cutting of short stock, or the cutting of short lengths of very long stock.

I claim:

1. A cutter guide table for operation on a plurality of workpieces at uniform length, the table comprising:
    an elongated flat table top having a series of support legs and having sides and ends;
    guide rails secured to the table top and extending upwardly from the sides from end to end;
    a swing arm assembly including swing arm carriage plates releasably engaged on the guide rails, arms pivotally secured to the carriage plates, and an elongated guide bar interconnecting the arms and transversely spanning the table;
    a backstop assembly including channels releasably engaged on the guide rails, a cross member extending over the table between the channels, clamp screws extending through the channels to engage the guide rails, and a vertical back wall depending from the cross member; and
    the cutter being engaged against the guide bar, with a plurality of workpieces arranged on the table and abutted against the vertical plate whereby traversal of the cutter operates at uniform position on each workpiece.

2. The invention of claim 1, wherein:
    the arms of the swing arm assembly each has a clamp arch section of curvilinear form.

3. The invention of claim 1, wherein:
    the carriage plates each has vertically extending slots formed therein with a series of horizontal intersects, and clamp screws with adjustment nuts extending through said slots for adjustment of the height of the plates relative to the table.

4. The invention of claim 1, and:
    an end extension assembly detachably mounted on the back wall of the backstop assembly.

5. The invention of claim 1, and:
    a pair of upright brackets extending upwardly from the backstop cross member; and
    a supplemental cross member adjustably and reversibly secured to said brackets.

6. The invention of claim 1, and:
    strip means extending along the table longitudinally containing measurement indicia.

* * * * *